United States Patent
Yamaguchi

(10) Patent No.: US 6,615,441 B2
(45) Date of Patent: Sep. 9, 2003

(54) CLEANING APPARATUS

(75) Inventor: Yorihisa Yamaguchi, Nagoya (JP)

(73) Assignee: Yugen Kaisha Showa Kogyosho, Nagoya (JP)

( * ) Notice: Subject to any disclaimer, the term of this patent is extended or adjusted under 35 U.S.C. 154(b) by 0 days.

(21) Appl. No.: 09/922,810

(22) Filed: Aug. 7, 2001

(65) Prior Publication Data
US 2002/0026682 A1 Mar. 7, 2002

(30) Foreign Application Priority Data
Sep. 7, 2000 (JP) .......................... 2000-271816

(51) Int. Cl.$^7$ ................................................ A47L 5/38
(52) U.S. Cl. ..................... 15/302; 15/304; 15/310; 15/409
(58) Field of Search ..................... 15/304, 310, 409, 15/302

(56) References Cited

U.S. PATENT DOCUMENTS

| | | | | |
|---|---|---|---|---|
| 3,004,276 A | * | 10/1961 | Hoffman .................... 15/306.1 |
| 3,765,051 A | * | 10/1973 | Wanat ......................... 15/302 |
| 4,750,505 A | * | 6/1988 | Inuta et al. ................... 134/153 |
| 4,808,234 A | * | 2/1989 | McKay et al. ................. 134/21 |
| 5,305,493 A | * | 4/1994 | Prenn ............................ 15/304 |
| 5,332,448 A | * | 7/1994 | Phillips ..................... 134/22.18 |
| 5,915,439 A | * | 6/1999 | Zaiser .......................... 15/304 |

* cited by examiner

Primary Examiner—Theresa T. Snider
(74) Attorney, Agent, or Firm—Dennison, Schultz & Dougherty

(57) ABSTRACT

A cleaning apparatus for cleaning cylindrical articles includes a container that defines a process chamber. The process chamber is adapted to receive cylindrical articles that have been soiled by dust. The process chamber is substantially closed except for an inserting/removing opening formed in the container. A dust duct is connected to the container so as to communicate with the process chamber. A device is provided for producing a gas-liquid mixture jet within the dust duct so as to induce airflow directed from the process chamber toward the dust duct. Therefore, dust will be drawn into the dust duct and will not scatter to the surrounding environment. The liquid may further wet the dust suspended within the dust duct in order to simplify the process for disposing of the dust removed from the article.

15 Claims, 12 Drawing Sheets

100 # CLEANING APPARATUS

BACKGROUND OF THE INVENTION

1. Field of the Invention

The present invention relates to cleaning apparatus that may be utilized to clean cylindrical articles, such as cylindrical air filters that are utilized with vehicle engines.

2. Description of the Related Art

Air filters for use with large size vehicles, such as trucks, generally have a cylindrical configuration with one closed end. These air filters become soiled with dust during operation of the vehicle and periodically must be cleaned or replaced. Conventionally, in order to clean such soiled air filters, compressed air is applied to the filter via an air nozzle so as to blow off the dust that has adhered to the filter material.

However, when this conventional cleaning process is used to clean soiled filters, dust will scatter and disperse to the surrounding environment. In particular, when such a conventional cleaning process is utilized at industrial companies, such as transport companies that must clean a large number of air filters, the surrounding environment of these companies becomes dusty because it is difficult to collect the dust once it has diffused into the air. Therefore, it has been a long-felt need to develop air filter cleaning techniques that permit soiled or dusty air filters to be cleaned without scattering the dust into the surrounding environment.

SUMMARY OF THE INVENTION

It is an object of the present invention to teach improved cleaning devices. Preferably, the present cleaning devices may be utilized to clean cylindrical articles and can dispose of dust without scattering or diffusing the dust into the surrounding environment.

According to the present teachings, cleaners are taught that can remove dust from cylindrical articles, such as air filters, without scattering the dust to the outside of a cleaning container. For example, a dust duct may be connected to a process chamber of the container and may include an aspirating device disposed within the dust duct. The soiled object is subjected to a pressurized airflow inside the container and, as a result, dust from the object will blow off inside the cleaning apparatus. The aspirating device preferably draws the dust from the process chamber into the dust duct. In one embodiment of the present teachings, the aspirating device may produce a gas-liquid mixture jet that induces airflow from the process chamber to the dust duct. The removed dust may be wetted in the dust duct by the liquid from the air-liquid mixture jet. Therefore, the removed dust can be disposed together with the liquid without scattering the removed dust into the surrounding environment.

DETAILED DESCRIPTION OF THE INVENTION

Figure 1:
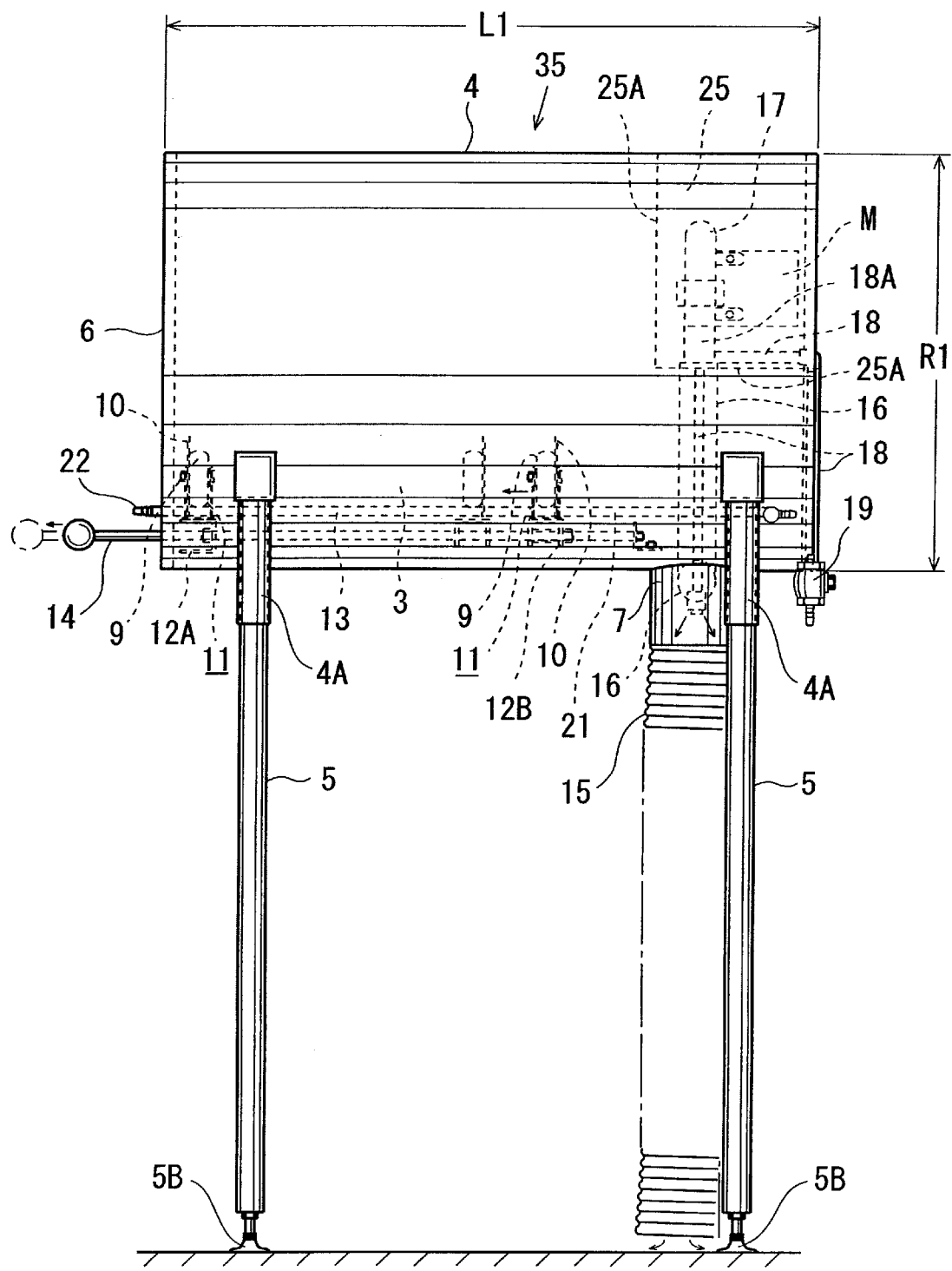
FIG. 1 is a side view of a representative cleaning apparatus adapted to clean cylindrical air filters.

According to the present teachings, cleaners are taught that are adapted to clean cylindrical articles. The cleaners may include a container that defines a process chamber. The process chamber may be adapted to receive cylindrical articles, for example, that have been soiled by dust. The process chamber may be substantially closed except for an inserting/removing opening formed in the container. A dust duct may be connected to the container so as to communicate with the process chamber. A device may be provided to produce an air-water mixture jet within the dust duct so as to induce a flow of air from the process chamber to the dust duct. Therefore, with the aid of the gas-liquid mixture jet, the dust can be discharged through the dust duct and can be appropriately disposed. Thus, the dust removed from the cylindrical article will not scatter to the surrounding environment.

More specifically, during the cleaning process, the dust removed from the cylindrical articles becomes suspended in the air within the process chamber. However, because of the induction and/or aspiration function of the gas-liquid mixture jet in the dust duct, the air that flows from the process chamber toward the dust duct will carry the dust to the dust duct. The dust may then be wetted by the liquid (e.g., water) injected into the dust duct. The gas-liquid mixture jet preferably injects an atomized liquid into the dust duct and the atomized liquid captures the suspended dust. Therefore, the dust may be processed as wastewater that contains the dust, so that the dust does not scatter to the surrounding environment. Moreover, the cleaner is easy to use and can thoroughly clean cylindrical articles, such as air filters.

Preferably, a support device may serve to support the cylindrical article in a suspended state within the process chamber. Therefore, the dust can be easily removed by rotating the cylindrical article while directing a high-speed airflow across and/or through the cylindrical article.

Preferably, the support device may include support rollers and support plates. The support rollers may serve to support the outer periphery of the cylindrical article. A pair of support plates may serve to hold or support the cylindrical articles from both sides in the longitudinal direction of the cylindrical article. The distance between the support plates may be adjustable to permit the support device to support a variety of cylindrical articles having different diameters and lengths. In addition, the cylindrical articles can rotate smoothly within the process chamber.

Preferably, the container may include a pipe connected to an air nozzle that provides a high-speed airflow. Therefore, the dust removing operation can be easily performed by connecting the air nozzle to the air pipe that supplies pressurized air to the air nozzle and directing the pressurized air from the air nozzle across and/or through the cylindrical article.

Each of the additional features and teachings disclosed above and below may be utilized separately or in conjunction with other features and teachings to provide improved cleaning apparatus and methods for designing and using such cleaning apparatus. A representative example of the present invention, which example utilizes many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe a representative example of the invention. Moreover, various features of the representative example and the dependent claims may be combined in ways that are not specifically enumerated in order to provide additional useful embodiments of the present teachings.

Figure 8A:
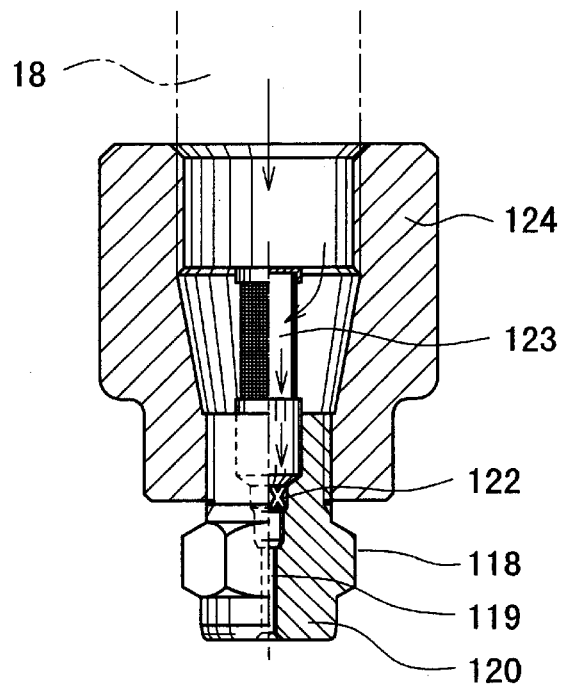
FIG. 8(A) is an enlarged, half sectional view of a representative spray member mounted on the lower end of the representative water supply pipe.
Figure 8B:
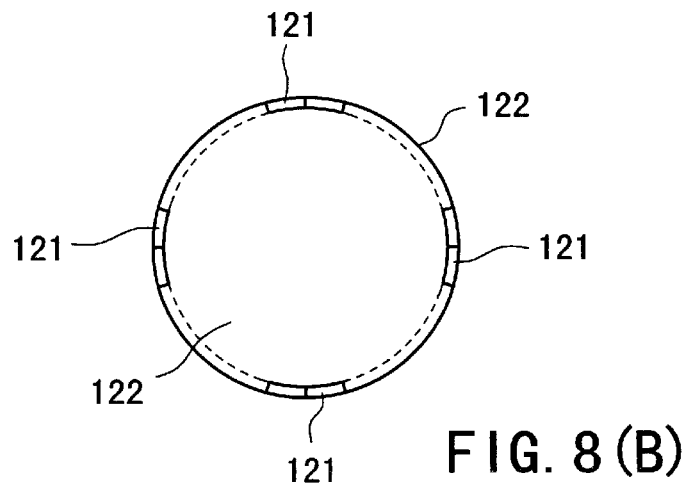
FIG. 8(B) is a plan view of a representative water control disk disposed within the representative spray member.
Figure 8C:
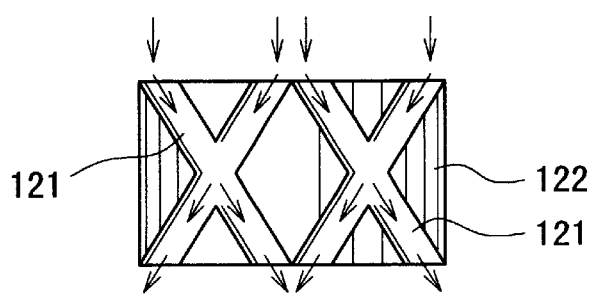
FIG. 8(C) is a side view of the representative water control disk.
Figure 9:
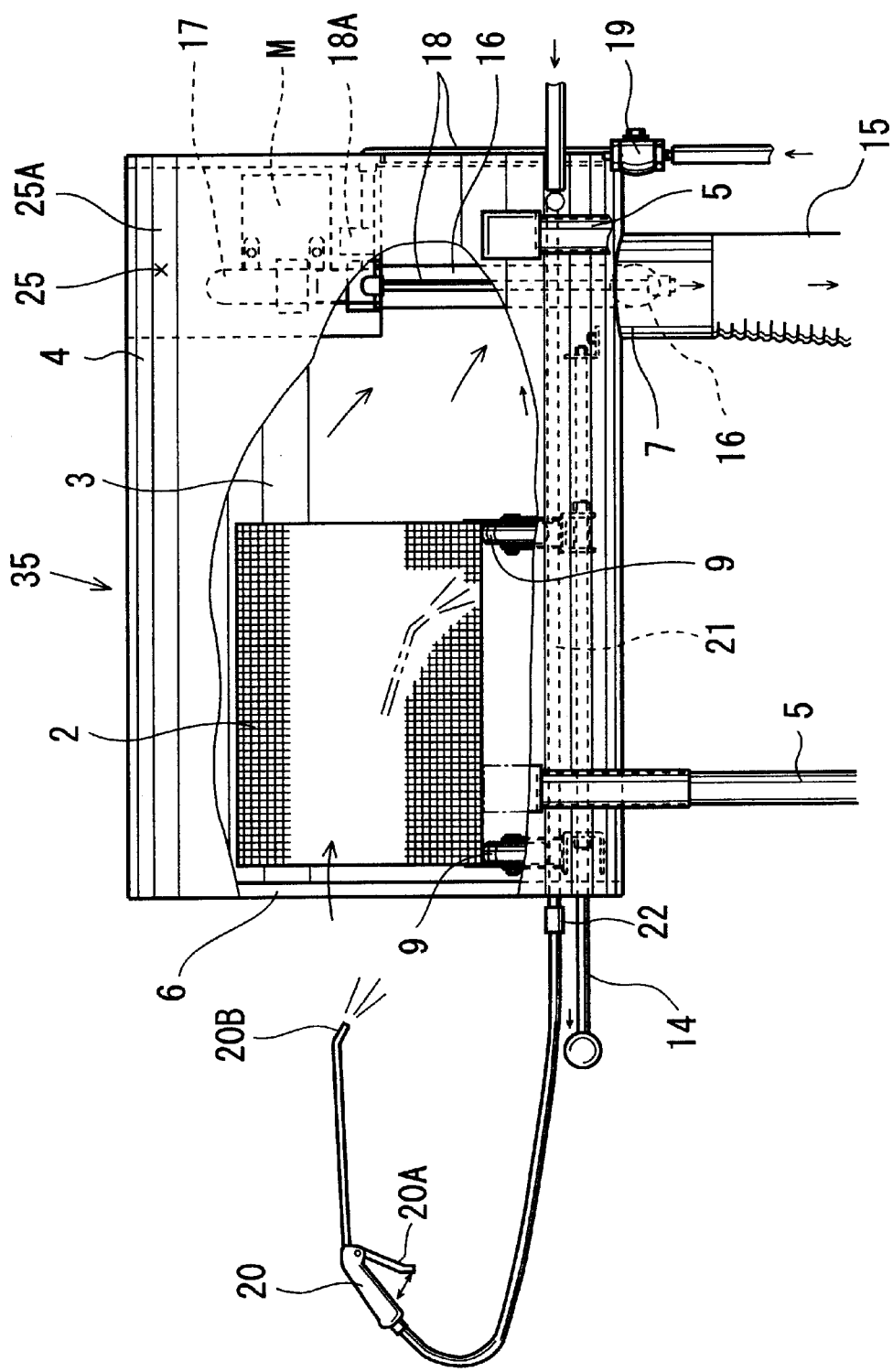
FIG. 9 is an explanatory view showing a representative operation for using the representative cleaning apparatus.
Figure 10:
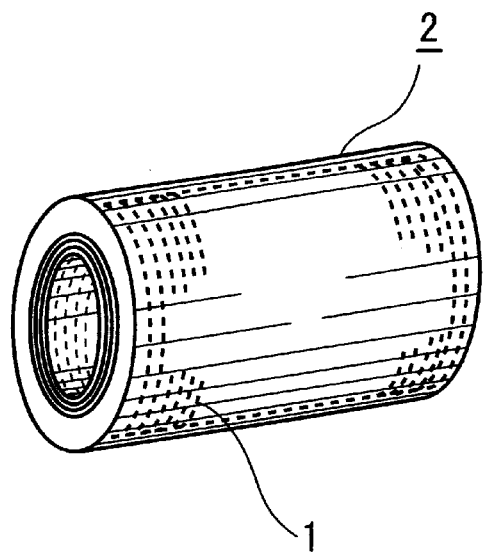
FIG. 10 is a perspective view of a representative air filter that can be cleaned by the representative cleaning apparatus.

A representative cleaner 35 is shown in FIGS. 1 to 11 and may be adapted to clean cylindrical articles, such as the air filter 2 shown in FIG. 10. The air filter 2 may be utilized, for example, in a diesel engine (not shown) and may include a cylindrical filter element 1.

Figure 11:
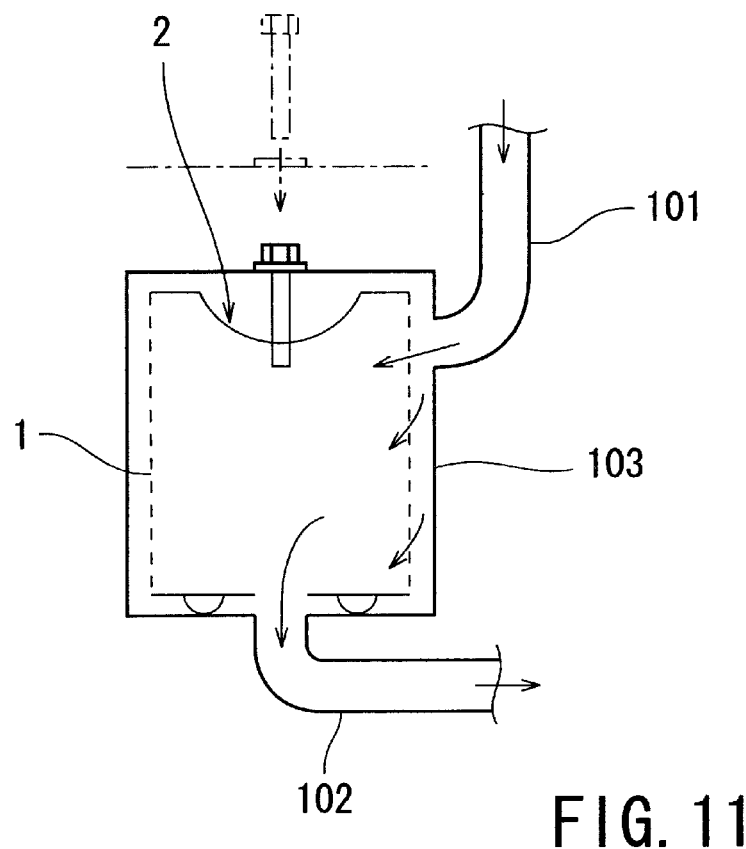
FIG. 11 is a schematic view showing a state in which the representative air filter is used.

For example, as shown in FIG. 11, the air filter 2 may be designed to filter air that will be fed into the diesel engine. The air filter 2 may be mounted within an installation section 103 between an air intake pipe 101 and an air supply pipe 102 that are associated with the engine. Therefore, filtered air can be supplied to the engine through the air supply pipe 102. If the air filter 2 has been excessively soiled, e.g. by dust filtered from the incoming air, the air filter 2 may be removed from the installation section 103 and may be cleaned.

Figure 2:
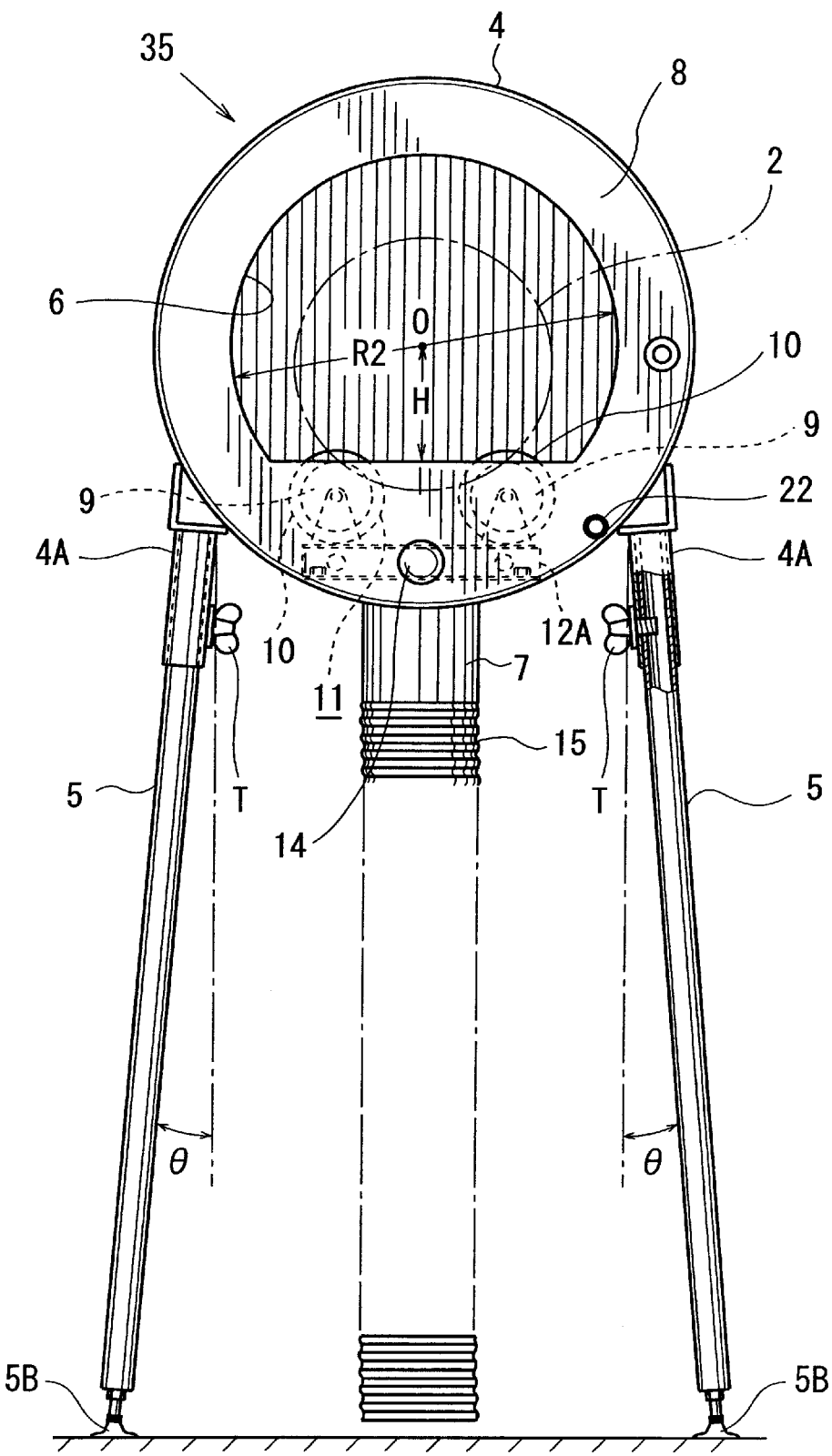
FIG. 2 is a front view of the representative cleaning apparatus.

As shown in FIGS. 1 and 2, the cleaner 35 may have an appearance similar to a side horse. For example, the cleaner 35 may include a substantially cylindrical drum-shaped container 4 and four support legs 5 that are attached to the container 4 so as to support the container 4 in a substantially horizontally oriented position. The interior of the container 4 may define a process chamber 3 for receiving the air filter 2. Preferably, the height of each of the support legs 5 may be adjusted as will be further explained below.

In a representative embodiment, the process chamber 3 within the container 4 may be substantially closed. However, an inserting/removing opening 6 may be formed at the front end of the container 4 and a duct connection port 7 may be formed at the bottom of the container 4. As shown in FIG. 2, the opening 6 may be defined by an inwardly projecting flange 8 that is positioned at the front end of the container 4, so that the opening 6 has a substantially D-shaped configuration with its straight side positioned at the bottom.

In one preferred embodiment, the container 4 may have a length L1 of about 90 cm and may have a diameter R1 of about 55 cm. The inserting/removing opening 6 may have a diameter R2 of about 40 cm and the distance H between the center 0 and the straight side of the opening 6 may be about 11 cm. Preferably, the container 4 may be formed from a steel plate and the outer surface is preferably painted to prevent corrosion and provide an attractive appearance.

In another preferred embodiment, each of the support legs 5 may have a length of about 100 cm. As shown in FIG. 2, which shows the front view of the cleaner 35, the support legs 5 may be inserted into tubular attachments 4A secured to the side portions of the container 4 and butterfly bolts T may fixedly fasten the attachments 4A to the support legs 5. Further, each pair of the right and left support legs 5 may be fixed in position such that the right and left support legs 5 are respectively inclined outwardly by an angle θ of about 5 degrees relative to the vertical direction. Accordingly, the right and left support legs 5 open downwardly and outwardly, so that the support legs 5 can stably support the container 4.

Figure 3:
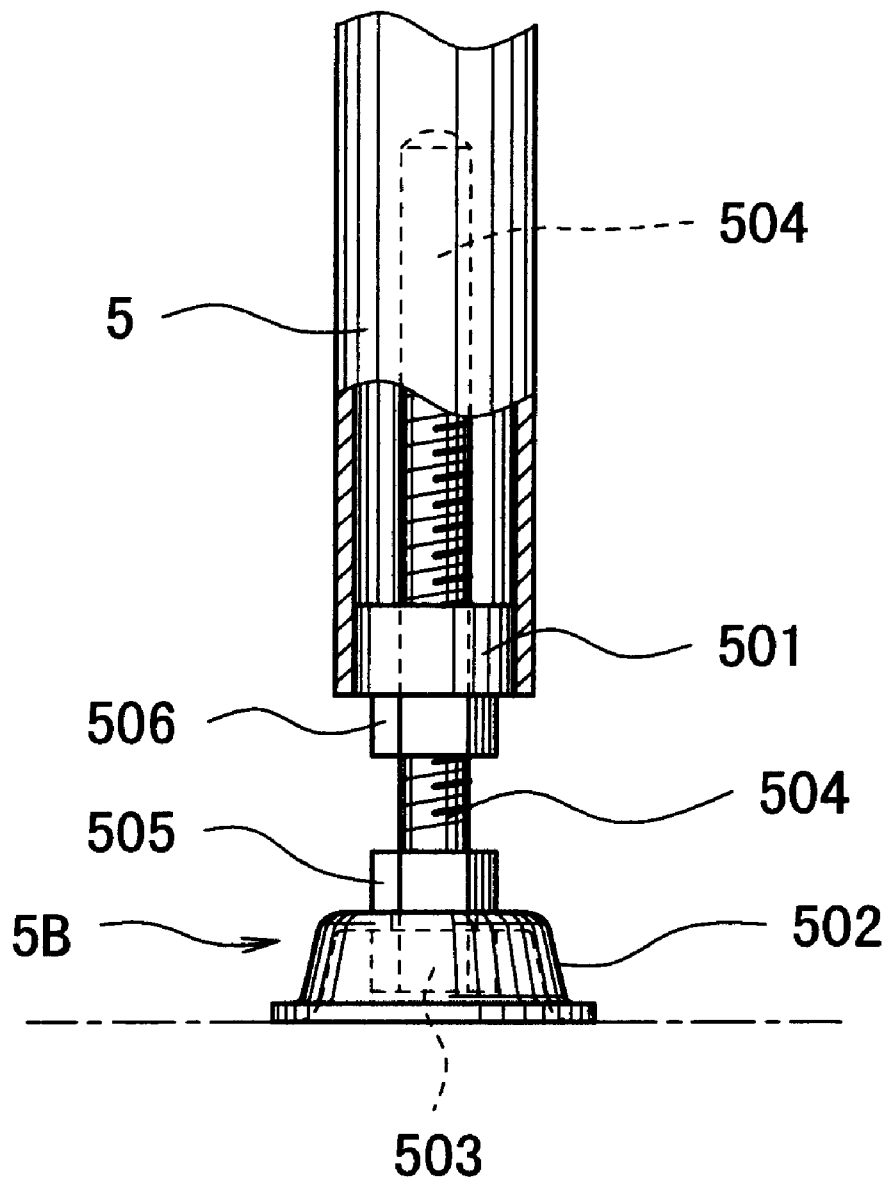
FIG. 3 is an enlarged, partially broken-away view of a lower portion of one of support legs of the representative cleaning apparatus.

An adjustment device SB may be provided at the lower end of each support leg 5, so that the height of the upper end of each support leg 5 can be adjusted. As shown in FIG. 3, the adjustment device SB may include, for example, a fixed nut 501 welded within the interior of a tubular lower end of the support leg 5. The adjustment device 5B also may include a bolt 503 with an elongated threaded shank 504, a slip-prevention member 502 and upper and lower nuts 505 and 506. The threaded shank 504 of the bolt 503 may be inserted into the slip-prevention member 502 in order to engage the fixed nut 501, so that a head of the bolt 503 is positioned within the slip-prevention member 502. The upper and lower nuts 505 and 506 engage the threaded shank 504 adjacent to the fixed nut 501 and the slip-prevention member 502, respectively. Thus, the upper nut 505 may cooperate with the fixed nut 501 so as to fix the bolt 503 in the vertical direction. The lower nut 506 may cooperate with the head of the bolt 503 so as to fix the slip-prevention member 502 in position relative to the bolt 503. Therefore, the distance between the lower end of the support leg 5 can be varied to change the position of the upper end of the support leg 5 by rotating the bolt 503 using an appropriate tool (not shown). The determined position can be fixed by tightening the upper nut 506 against the fixed nut 501. Preferably, the adjustment device SB may permit the position of the upper end of the support leg 5 to be changed within a range of at least about 10 cm. The adjustment devices SB may be adjusted in response to an uneven installation surface on which the cleaner 35 is installed, in response to the height of the operator, or for any other reason.

Preferably, the tubular attachments 4A and the support legs 5 may be made of metal and may be coated with the same color paint as the paint on the container 4.

Figure 4:
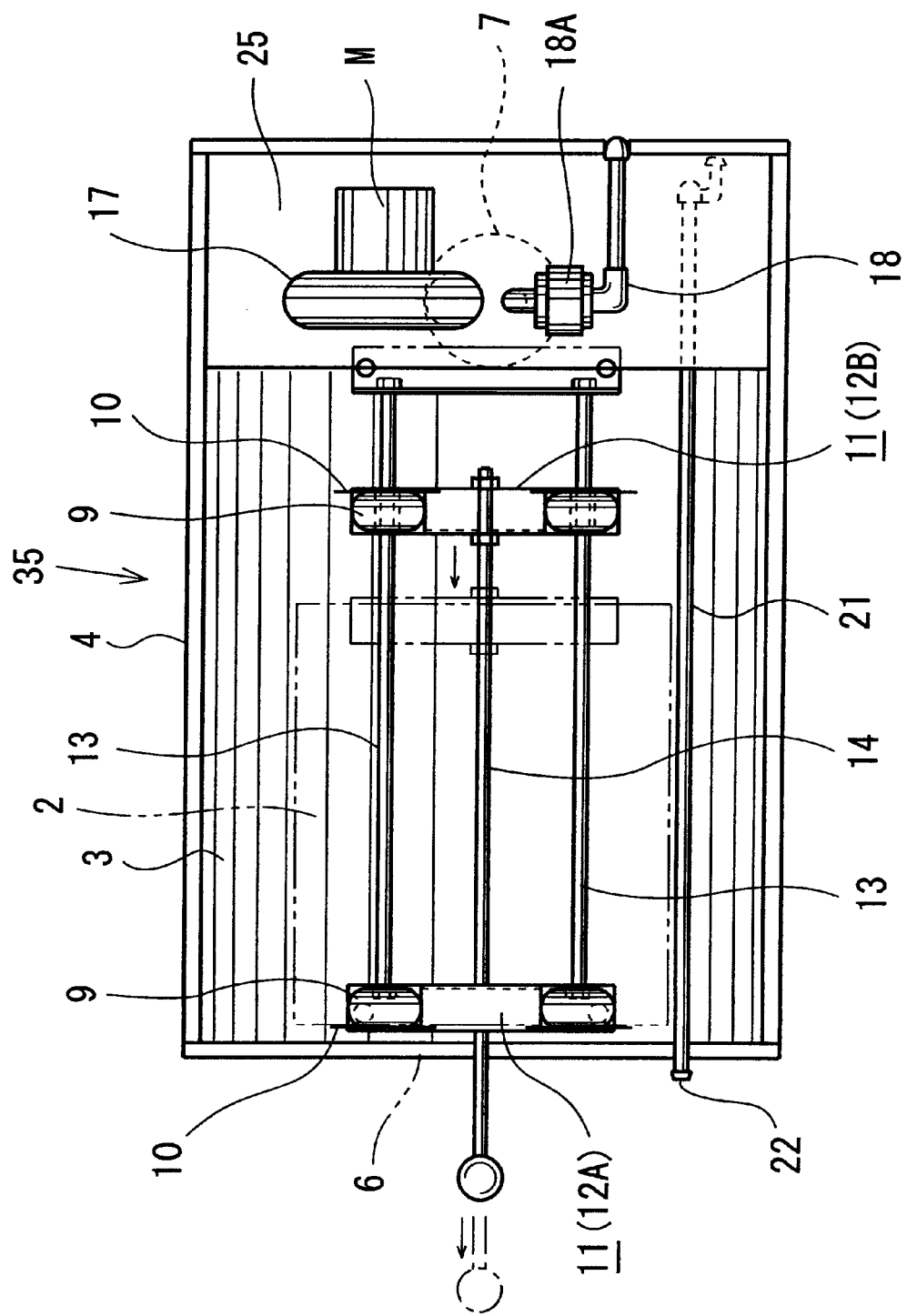
FIG. 4 is sectional plan view of the representative cleaning apparatus.
Figure 5:
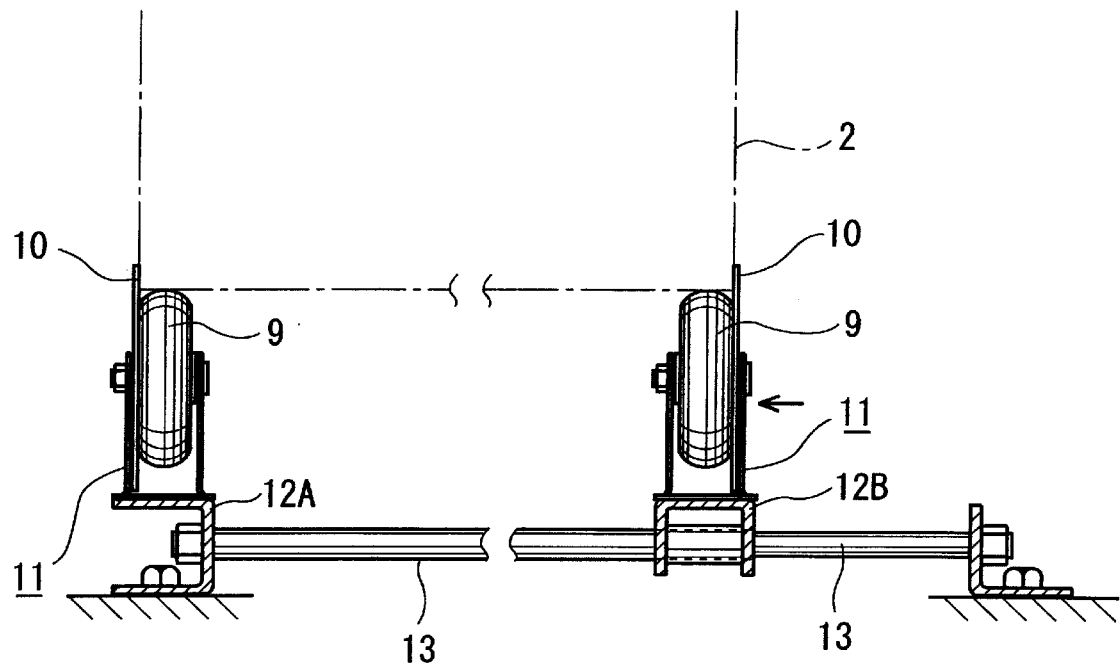
FIG. 5 is a side view of representative front and rear support devices of the representative cleaning apparatus.
Figure 6:
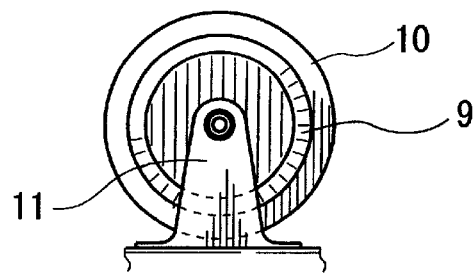
FIG. 6 is a front view of one representative support roller of the support devices.

Referring to FIGS. 1, 2 and 4, a pair of support devices 11 may be disposed within the bottom portion of the process chamber 3. The support devices 11 may be located at the front portion of the process chamber 3 adjacent to the inserting/removing opening 6. Each of the support devices 11 may include, for example, a pair of support rollers 9 and a pair of support plates 10. The support rollers 9 can rotate about their respective horizontal axes and may serve to support the outer periphery of the air filter 2. The support plates 10 of the front support device 11 may cooperate with the support plates 10 of the rear support device 11 so as to support both longitudinal ends of the air filter 2. The distance between the front and rear support devices 11 preferably can be adjusted as will be further explained below. As shown in FIGS. 5 and 6, each of the support plates 10 may have a disk-like or wheel-like configuration and may be fixedly attached to one side of the corresponding support roller 9. More specifically, the support plates 10 of the front support device 11 may be disposed on the front side (left side as viewed in FIG. 5) of the corresponding support rollers 9. Naturally, the support plate 10 of the rear support device may be disposed on the rear side (right side as viewed in FIG. 5) of the corresponding support rollers 9. As a result, the air filter 2 can be rotatably supported by the support rollers 9 from the lower side, while the air filter 2 is retained between the support plates 10 of the front support device 11 and the support plates 10 of the rear support device 11 (see FIGS. 4, 5 and 9). As shown in FIGS. 4 and 5, the support rollers 9 of the front support device 11 may be mounted on a fixed base 12A that is fixed in position relative to the bottom of the container 4. On the other hand, the support rollers 9 of the rear support device 11 may be mounted on a movable base 12B that can slide along a pair of guide shafts 13 in the forward and rearward directions-(left and right directions as viewed in FIG. 4). The guide shafts 13 may be secured to the bottom of the container 4. As shown in FIG. 4, an operation rod 14 may be connected to the middle portion of the movable base 12B and may extend forwardly beyond the front end of the container 4. Therefore, the operator can change the position of the movable base 12B using the operation rod 14.

Figure 7:
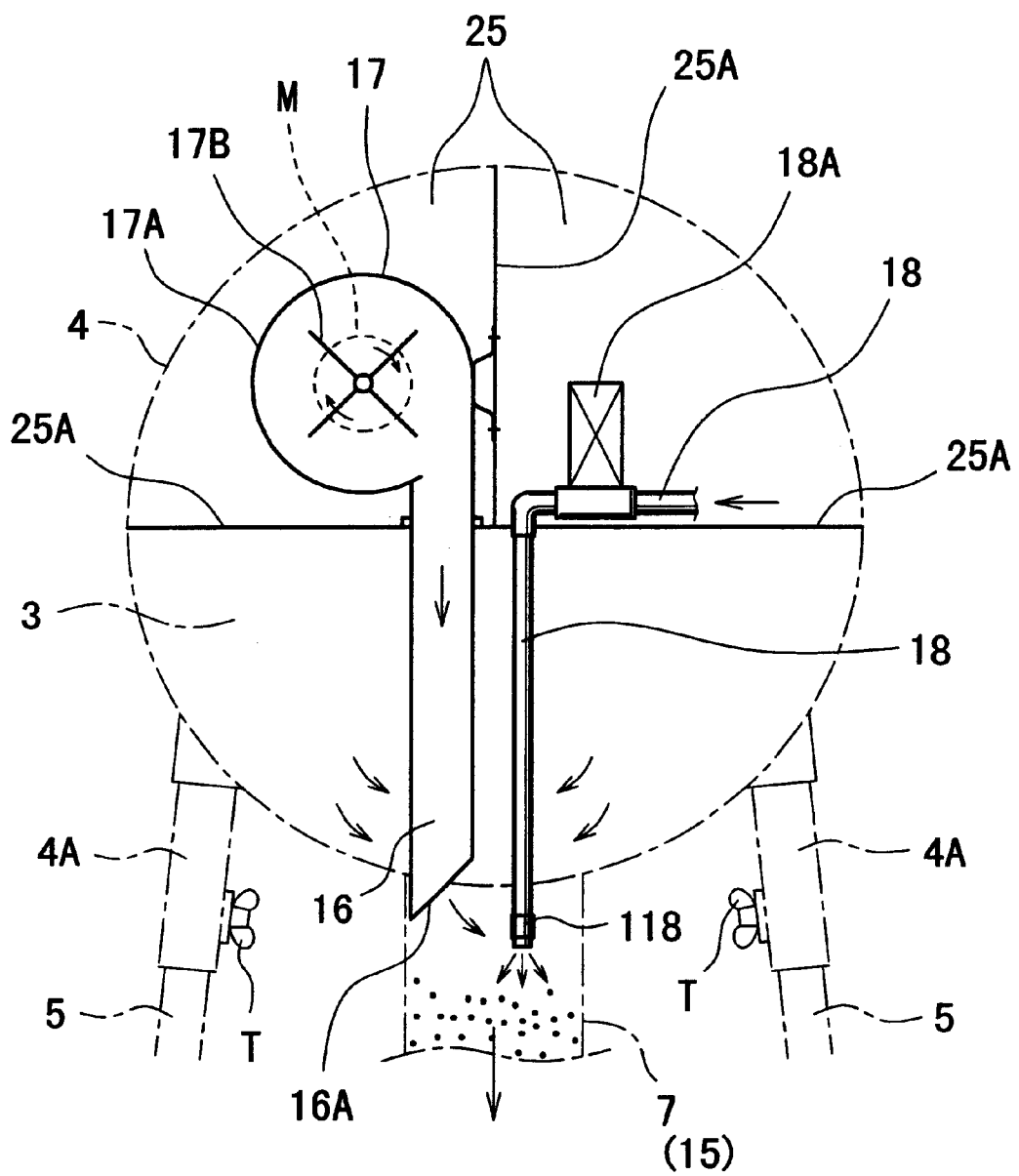
FIG. 7 is a schematic view showing a representative air blower, nozzle and water supply pipe of the representative cleaning apparatus.

As shown in FIGS. 1 and 2, a flexible dust duct 15 may be connected to the duct connection port 7 of the container 4 and may extend downwardly from the container 4. Preferably, the dust duct 15 may be made of vinyl chloride, although naturally other materials may be utilized. In addition, the dust duct 15 may have an inner diameter of about 12 cm and may extend to a position close to the installation surface. As shown in FIG. 1, a nozzle 16 may be disposed within the duct connection port 7 and may serve to inject air obliquely downward within the duct connection port 7. For example, an air blower 17 may supply high-pressure air to the nozzle 16. The air blower 17 may be disposed within a machine section 25 that is defined by a partition plate 25A disposed on the upper portion of the process chamber 3. As shown in FIG. 7, the air blower 17 may have rotary vanes 17B disposed within a housing 17A, a part of which is connected to the nozzle 16 that is inserted into the dust duct 15. The rotary vanes 17B may be attached to a drive shaft of a motor M (see FIGS. 1 and 4), so that high-pressure air is supplied into the nozzle 16 by rotating the rotary vanes 17. For example, the motor M may be a 100V, 75 W motor, and the number of the rotary vanes 17B may be four. With this design, a flow rate of 3.1 m³/sec can be obtained when the motor M is driven.

As shown in FIG. 7, a lower part of the water supply pipe 18 may be disposed substantially parallel to the nozzle 16 and adjacent to the nozzle 16. The lower end of the water supply pipe 18 may extend to a position slightly below the lower end of the nozzle 16 and may have a water discharger 118. The water discharger 118 is also known as a water atomizer and may have a structure as shown in FIGS. 8(A), 8(B) and 8(C). For example, the water discharger 118 may include a water spray member 120 having a small water discharge channel 119. A water control disk 122 may be inserted into the water spray member 120 and may have X-shaped water flow grooves 121 formed in an outer periphery thereof. A netted cylinder (or strainer) 123 also may be inserted into the water spray member 120 and may be disposed above the water control disk 122. A lower end of a socket 124 may threadably engage the upper end of the water spray member 120. In addition, the upper end of the socket 124 may be threadably engaged with the lower end of the water supply pipe 18. Therefore, as shown in FIG. 8(A), the water supplied into the water supply pipe 18 flows through the water discharger 118 via the netted cylinder 123 and the water flow grooves 121 of the water control disk 122 and then will be sprayed out of the water discharge hole 119. Thus, a source of atomized water (or another liquid) can be generated within the dust duct 15.

The nozzle 16 may have a lower open end 16A that is inclined toward the lower portion of the water supply pipe 18 so that the air discharged from the lower open end 16A is applied to the water spray. Therefore, the water spray may be directed downward within the dust duct 15 and may be discharged to the outside from the lower end of the dust duct 15.

The upper end of the water supply pipe 18 may extend to the outside of the container 4 and may be connected to a water supply (not shown). A solenoid valve 18A may be provided on the water supply pipe 18 and may be normally closed. When an operation switch (not shown) for operating the motor M is turned on, the solenoid valve 18A opens. Therefore, pressurized water (e.g. about 7 Kgf/cm²) will flow from the water supply through the water supply pipe 18 before reaching the lower end of the water supply pipe 18.

The nozzle 16 may serve to convert the high pressure air from the air blower 17 into a high speed air flow and may serve to disperse the water spray supplied from the water supply pipe 18. As a result, a jet of an air-water mixture may be radiated downward and may be distributed throughout the inner diameter of the dust duct 15. The injection of the high-speed airflow from the nozzle 16 may induce airflow from the process chamber 3 toward the dust connection port 7. That is, the high-speed airflow created within dust duct 15 will aspirate dust from the process chamber 3 into the dust duct 15.

As shown in FIG. 9, an air nozzle 20 may be connected to an air pipe 21 and may serve to direct a high-speed airflow towards the cylindrical article that will be cleaned. The air pipe 21 may be disposed within the bottom portion of the process chamber 3 and may connect to the air nozzle 20 at a position on the front side of the container 4. The air pipe 21 may be connected to a compressor or another source of pressurized air that is disposed on the rear side of the container 4. Preferably, the pressure of the high-speed air expelled from an elongated nozzle pipe 20B of the air nozzle 20 may be about 0.6 to 0.9 MPa.

Figure 12:
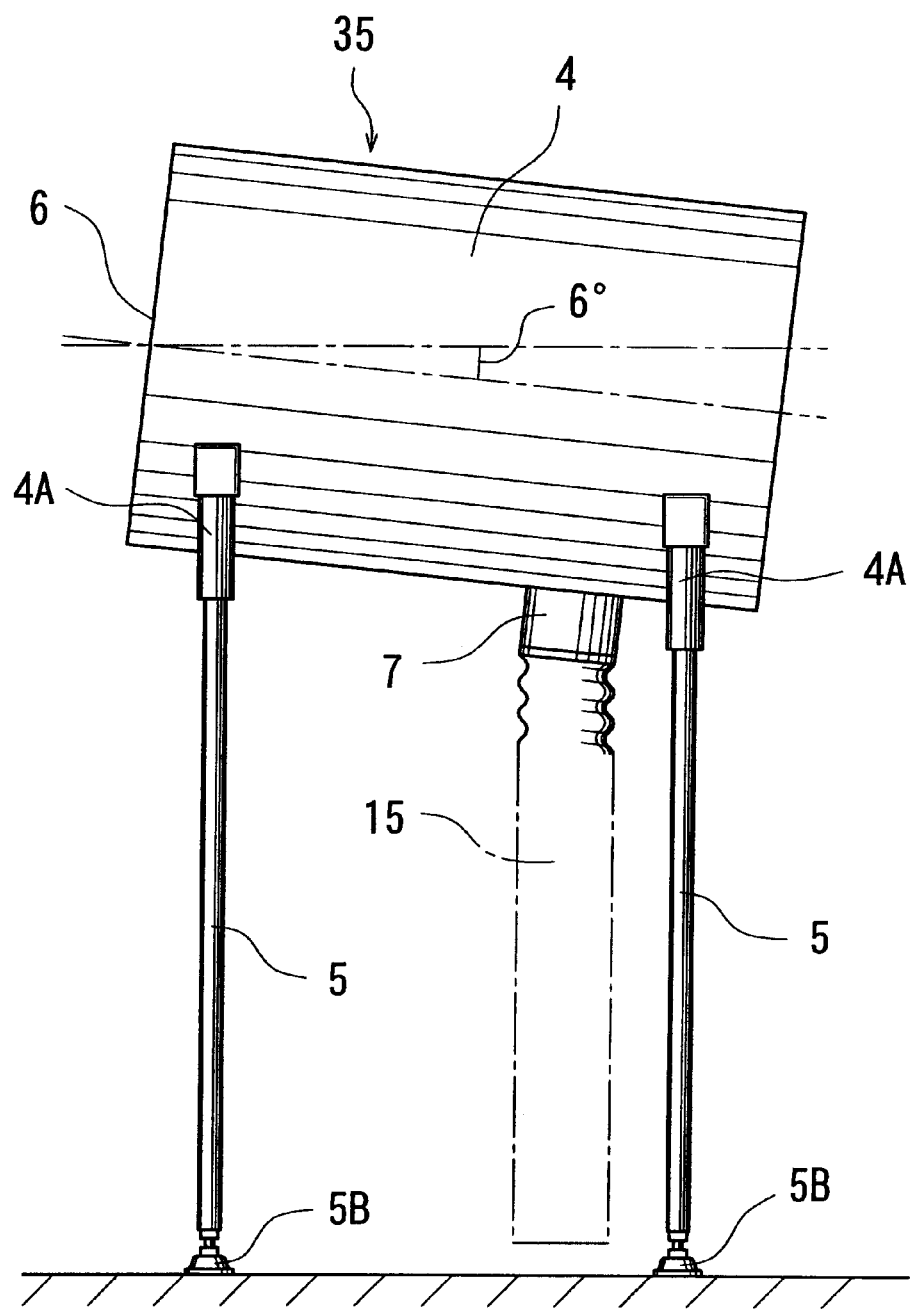
FIG. 12 is a schematic side view of the representative cleaning apparatus arranged such that the container is slightly inclined relative to the horizontal direction.
Figure 13:
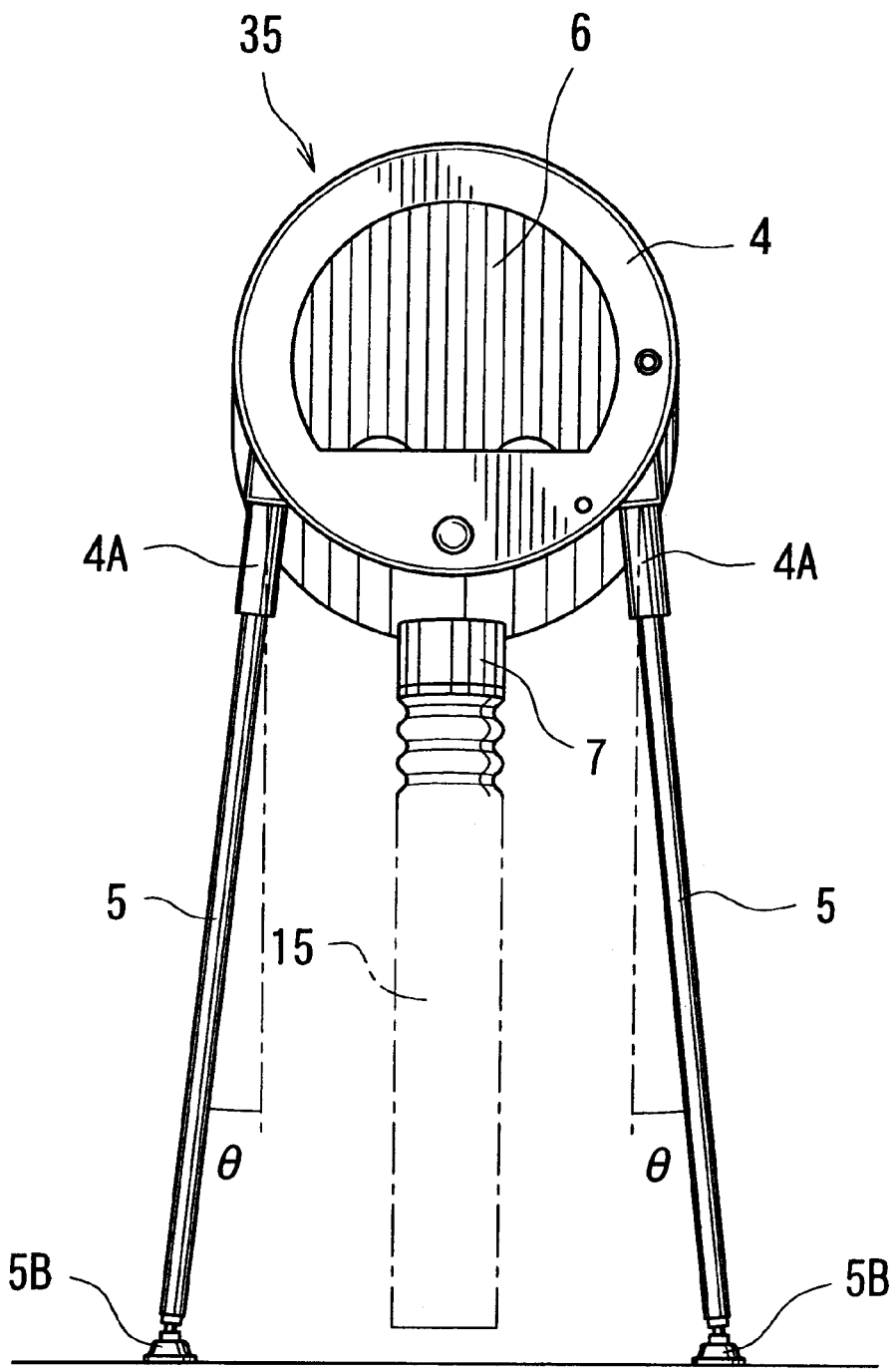
FIG. 13 is a schematic front view of the representative cleaning apparatus shown in FIG. 12.

In operation, the cleaner 35 may preferably be set such that the container 4 is slightly inclined relative to the horizontal position with the front side or the side of the inserting/removing opening 6 being disposed higher than the rear side of the container 4. This arrangement is shown in FIGS. 12 and 13 and the container 4 in this arrangement is inclined by an angle of 6° relative to the horizontal direction.

More specifically, the heights of the front support legs 5 and the rear support legs 5 may be set to be 110 cm and 100 cm, respectively. With this arrangement, the operator can clean the cylindrical article while easily observing the air filter 2 through the inserting/removing opening 6. Thus, the lengths of the support legs 5 can be appropriately adjusted to suit the height of the operator. As shown in FIG. 9, in order to clean the air filter 2, the water supply pipe 18 may be connected to the pressurized water supply and the air nozzle 20 device may be connected to a front connection port 22 of the air pipe 21. Further, a rear connection port (not shown) of the air pipe 21 may be connected to the compressor or another source of pressurized air. Then, the soiled air filter 2 may be placed into the container 4 through the inserting/removing opening 6. Preferably, the air filter 2 may be oriented such that its closed end is closest to the rear end of the container 4. As a result, the outer periphery of the filter 2 may be supported by the front and rear support rollers 9 from the lower side. The operation rod 14 may then be operated to move the rear holding device 11 to a position suited to the length of the air filter 2. Thus, the air filter 2 will be reliably supported between the support plates 10 of the front and rear support devices 11 (see FIG. 9). Consequently, axial movement of the air filter 2 may be restricted within the process chamber 3 while the air filter 2 is supported in a suspended state and is free to rotate within the process chamber 3 about its longitudinal axis.

Subsequently, a valve 19 (see FIG. 9) of the water supply pipe 18 is opened and an operation switch (not shown) is turned on in order to open the solenoid valve 18A shown in FIG. 7 and to start the motor M of the air blower 17. As a result, an air-water mixture jet will be produced within the dust duct 15, so that a flow of air toward the dust duct 16 may be inducted within the process chamber 3. Then, the operator holds the air nozzle 20 and pulls a lever 20A of the air nozzle 20, so that a high-speed airflow is expelled from the nozzle tip 20B towards the air filter 2 positioned within the process chamber 3. While applying the high-speed airflow to the air filter 2, the operator can manually rotate the air filter 2, so that the high-speed airflow is uniformly applied to the air filter 2. Because the air filter 2 is suspended within the process chamber 3 and because the air filter 2 can be manually rotated, it is possible to effectively remove the dust adhered to the air filter 2 by application of the high speed air flow and to discharge the removed dust into the process chamber 3. For example, the portion of the dust having a high specific gravity (high-density dust) will likely fall to the bottom of the process chamber 3. On the other hand, the portion of the dust having a low specific gravity (low-density dust) will be attracted toward the duct connection port 7, due to the induced airflow within the process chamber 3. Because the inwardly projecting flange 8 is provided at the inserting/removing opening 6 of the process chamber 3 and because a pressure gradient within the process chamber 3 becomes lower toward the rear portion of the process chamber 3, the removed dust generally does not escape through the inserting/removing opening 6.

The dust carried by the induced air flow may enter the duct connection port 7 and then may be wetted by a spray or shower of atomized liquid, which is produced by the air-water mixture jet (i.e. high pressure air from the nozzle 16 and the water spray from the water supply pipe 18). Therefore, the dust may be captured by the atomized water or may be immersed into the water. Because the dust in this state does not fly off or scatter, the dust can be processed together with the water. Thus, the dust may be discharged into a drainage, a process tank or other disposal means via the dust duct 15 without scattering to the outside. Therefore, the dust can be processed in an environmental friendly manner. In addition, the cleaning operation requires only a few minutes, so that the air filter 2 can be quickly cleaned. The cleaned air filter 2 may be removed from the process chamber 3 by reversing the steps for inserting the air filter 2 into the process chamber 3. Because the air filter 2 does not become wet with water during the cleaning process, the air filter 2 can be used again for filtration purposes. Although the cleaner 35 of the representative embodiment was described in terms of cleaning the air filter 2 that has a simple cylindrical configuration, the cleaner 35 also can be used for cleaning the other types of filters, such as corrugated cylindrical filters.

Figure 14:
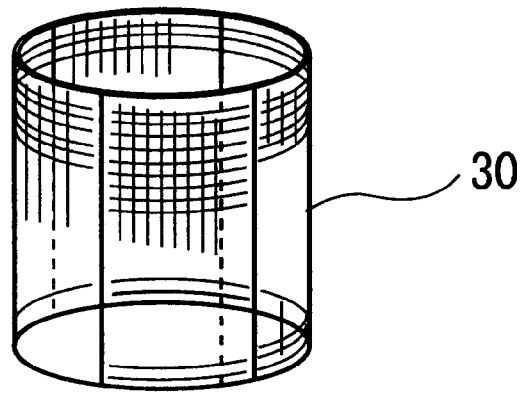
FIG. 14 is a perspective view of another representative cylindrical article that can be cleaned using the representative cleaning apparatus of FIG. 1.
Figure 15:
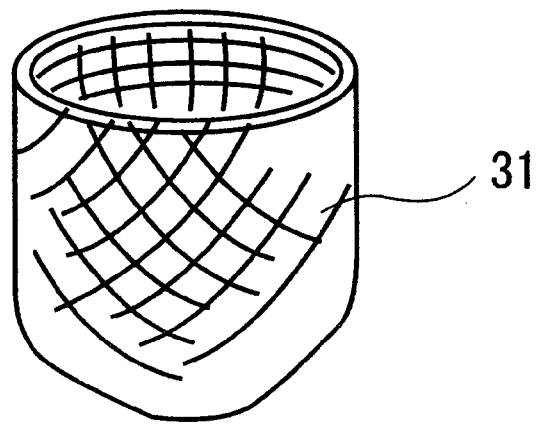
FIG. 15 is a perspective view of yet another representative cylindrical article that can be cleaned using the representative cleaning apparatus of FIG. 1.

Further, although the above representative embodiment has been described in connection with a cleaner for cleaning air filters, the same cleaner can also be used for cleaning other cylindrical articles, such as netted or perforated cylindrical articles. For example, the representative cleaner 35 can be used to clean a parts container 30 as shown in FIG. 14 and/or a bamboo basket 31 as shown in FIG. 15. The parts container 30 may be formed of a wire mesh and may be used in factories for storing mechanical parts. The bamboo basket 31 may be used, for example, for agricultural purposes.

What is claimed is:

1. A cleaning apparatus comprising:
    a container defining a process chamber for receiving an article to be cleaner;
    a dust discharge pipe connected to the container and in communication with the process chamber;
    an aspirator that generates a flow of air from the process chamber toward the dust discharge pipe; and
    a source of liquid disposed within the dust discharge pipe, wherein the liquid wets dust that enters into the dust discharge pipe.

2. The cleaning apparatus as in claim 1, further including a support device disposed within the container, the support device rotatably supporting the article within the container.

3. The cleaning apparatus as in claim 2, wherein the support device is arranged and constructed to rotatably support a substantially cylindrical article about the longitudinal axis of the substantially cylindrical article.

4. The cleaning apparatus as in claim 3, wherein the support device includes at least two rollers disposed at a bottom portion of the container, wherein the rollers contact an outer periphery of the cylindrical article from a lower side.

5. The cleaning apparatus as in claim 4, further including a restraining device for restraining movement of the article along the longitudinal axis.

6. The cleaning apparatus as in claim 5, wherein the restraining device includes at least a pair of support plates that oppose longitudinal ends of the article.

7. The cleaning apparatus as in claim 6, wherein a distance between the support plates is adjustable in response to the length of the article to be cleaned.

8. The cleaning apparatus as in claim 7, wherein the aspirator comprises an air nozzle disposed within the dust discharge pipe, the air nozzle serving to inject pressurized air into the dust discharge pipe so as to draw dust from the process chamber into the dust discharge pipe.

9. The cleaning apparatus as in claim 8, wherein the source of liquid comprises a water atomizer disposed within the dust discharge pipe, wherein pressurized air from the air nozzle is mixed with atomized water in the dust discharge pipe in order to draw dust into the dust discharge pipe and capture the dust in water drops.

10. The cleaning apparatus as in claim 1, the process chamber is substantially closed except or an inserting/removing opening defined in the container and the aspirator further means for producing a gas-liquid mixture jet flow within the dust discharge pipe so as to induce airflow from the process chamber into the dust discharge pipe, wherein dust from the article to be cleaned is discharged through the dust discharge pipe.

11. A method for cleaning an article using the cleaning apparatus of claim 10, comprising:

actuating the means for producing a gas-liquid mixture jet flow to apply a high speed gas-liquid jet flow to an article disposed within the process chamber and wetting and aspirating dust blown off the article into the dust discharge pipe.

12. A cleaning apparatus as in claim 1, wherein the source of liquid comprises a water atomizer disposed within the dust discharge pipe, such that atomized water from the water atomizer wets dust that enters into the dust discharge pipe, wherein the aspirator comprises an air nozzle disposed within the dust discharge pipe, the air nozzle being arranged and constructed to inject pressurized air into the dust discharge pipe so as to draw dust from the process chamber into the dust discharge pipe, wherein the pressurized air from the air nozzle is mixed with the atomized water in the dust discharge pipe in order to draw dust into the dust discharge pipe and capture the dust in water drops, and wherein the process chamber is substantially closed except for an inserting/removing opening defined in the container.

13. A method for cleaning an article using the cleaning apparatus of claim 12, comprising:

actuating the water atomizer and air nozzle to apply a high speed air-water flow to an article disposed within the process chamber, and wetting and aspirating dust blown off the article into the dust discharge pipe.

14. The method for cleaning an article, comprising:

providing an article into a process chamber;

applying a high-speed airflow to the article to remove dust adhered thereto;

aspirating dust blown off the article into a dust discharge pipe connected to the process chamber; and, applying an atomized liquid to the dust that enters into the dust charge pipe in order to wet the dust to prevent from scattering to the surrounding.

15. The method as in claim 14, further including rotating the article disposed within the process chamber while applying the high-speed airflow to the article.

* * * * *